July 7, 1959  C. H. SNYDER  2,893,334
ROOT FEEDER NOZZLE
Filed Jan. 11, 1954

INVENTOR.
CLIFFORD H. SNYDER
BY
ATTORNEY

United States Patent Office 2,893,334
Patented July 7, 1959

2,893,334

ROOT FEEDER NOZZLE

Clifford H. Snyder, Dormont, Pa.

Application January 11, 1954, Serial No. 403,126

1 Claim. (Cl. 111—7.1)

This invention relates generally to nozzles and more particularly to control nozzles for use on garden hoses to feed roots of plants and trees.

Plants and trees frequently need food and one of the best ways to get this food to them is by dissolving the food in water and supplying the water to the roots of the plant or tree. If the food will not dissolve it may be finely ground and is kept in suspension by water agitation. It can be metered with the conveyor water to feed the plant or tree in the same manner.

The plant food should be released near to the vicinity of the roots and not at the top of the soil as it will be dissipated before it reaches the roots. The food may be discharged around the plant by forcing a stem into the ground that has an opening at its lower end for discharging the food by means of a liquid stream near or adjacent the roots of the plant or tree. By the use of this root feeder nozzle one is enabled to shut off the flow of liquid and position it at various locations in the ground around the tree or plant.

The principal object of this invention is the provision of a root feeder nozzle having a hollow stem connected with a handle for the purpose of inserting the same in the ground and for conveying liquid with plant food for supplying and feeding the same to the roots of the plants.

Another object is the provision of the valve means for controlling and shutting off the flow of liquid through the handle and to the stem of the root feeder nozzle.

Another object is the provision of a handle on the root feeder nozzle constructed to permit visual record of the liquid passing therethrough.

Other objects and advantages appear hereinafter in the following description and claims.

The accompanying drawings show for the purpose of exemplification without limiting the invention or claim thereto certain practical embodiments illustrating the principles of the invention wherein:

Figure 1:
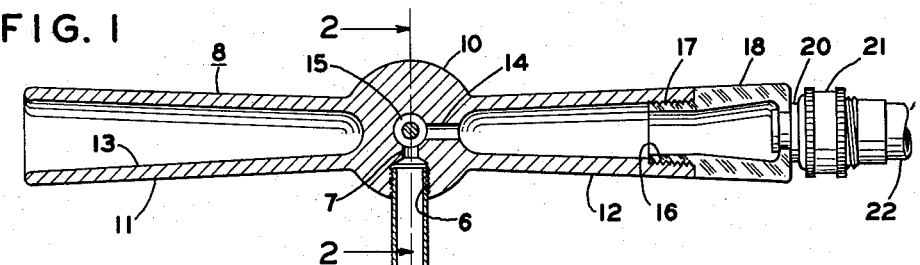
Fig. 1 is a view in vertical section of the root feeding nozzle comprising this invention.

Referring to the drawings, the root feeding nozzle comprises the stem 1 which is a piece of pipe having its lower end plugged by the plug member 2 which in this instance is a pointed member having its shoulder 3 against which the end of the pipe engages. The pointed plug 2 is also provided with a post 4 that extends upwardly into the bore of the stem 1 to close the lower end of the same. The plug 2 may be brazed, welded or otherwise secured to the end of the stem 1 and functions as a penetrating point for inserting the stem into the ground.

The lower end of the stem 1 immediately above the plug 4 is vented by means of the openings 5 which permit the fluids which pass downwardly through the stem to be discharged into the ground.

The upper end of the stem is threadably received in the socket 6 which is connected to the vertical passage 7 in the handle member 8. The handle member 8 is provided with a central section 10 and the oppositely disposed lateral sections 11 and 12. The section 11 is hollow as indicated at 13, however, the handle section 12 is provided with the lateral passageway 14. The lateral passageway 14 and the vertical passageway 7 connect with one another in the transverse chamber 15 which passes all the way through the central portion 10 of the handle which is substantially spherical in shape.

The outer end of the lateral passageway 14 is threaded as indicated at 16 to receive the threaded end 17 of the plastic member 18 which is constructed of a material such as methylmethacrylate owing to the fact that it is sufficiently transparent to permit a visual record of the liquid passing to the lateral passage 14. The outer surface of the plastic member 18 flushes off the handle 12 to the same diameter and the same length as the opposite handle 11. The end of the plastic member 18 is provided with a hose connection 20 which is provided with the internally threaded ferrule 21 for threadably receiving the end of the hose 22.

Figure 4:
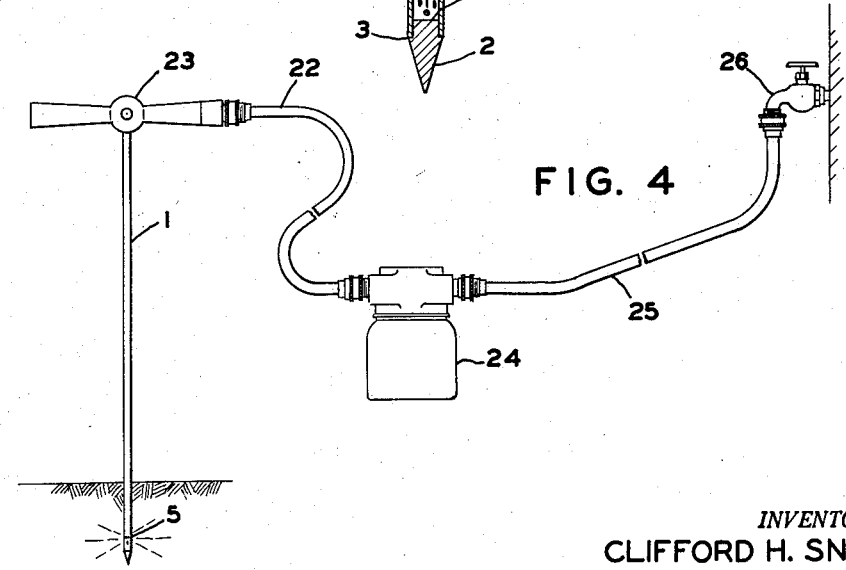
Fig. 4 is a schematic view illustrating the use of this invention.

As shown in Fig. 4 the root feeder nozzle which is generally indicated at 23 is connected by the hose 22 to the spray container 24 which in turn is connected by the hose 25 to a faucet such as indicated at 26. A mixture of the material to be employed to feed the roots of plants and trees is placed in the container 24 and by reason of its structure this material is metered with a conveying liquid which in this case is the water received from the tap 26, discharged through the hose 22 to the root feeder nozzle 23 and thence travels through the lateral passage 14 of the chamber 15 and the vertical passage 7 and then downwardly through the stem 1 where it is thence discharged as indicated at 5 in the ground, the nozzle having been forced into the ground adjacent the roots to be fed. By employing a color in the material to be dispensed one may observe the same flowing through the plastic member 18 and thus determine whether or not the liquid is carrying the material to be dispensed for feeding the roots of the plant or tree. If the color fades then the observer knows that the material is diminishing and replenishes the same in the container 24. By timing and metering the flow of the material being fed one can insert the root feeder nozzle at different relative positions around the tree or plant to properly feed all of the roots of the same.

Figure 3:
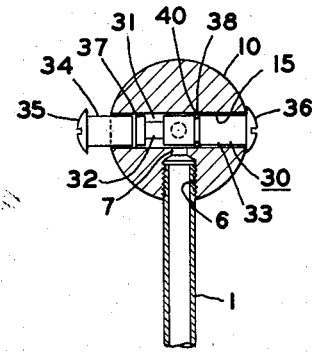
Fig. 3 is a view similar to Fig. 2 showing the valve member in its shutoff position.
Figure 2:
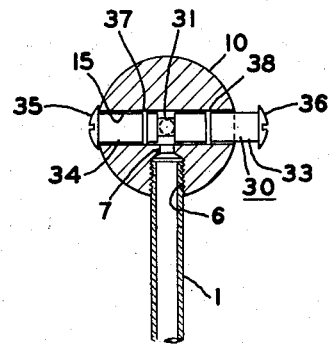
Fig. 2 is a sectional view taken on the line 2—2 of Fig. 1.

In order to control the amount of flow passing to the stem of the root feeder nozzle and in order to control the stoppage of the flow, a valve member 30 as shown in Figs. 2 and 3 is provided in the chamber 15. The valve member 30 is a cylindrical member of uniform diameter and is somewhat longer than the chamber 15 as indicated on the drawings. The valve member 30 is provided with an intermediate cutaway portion 31 which in Fig. 2 is aligned with the lateral passage 14 and the vertical passage 7 thus allowing the liquid to travel from the hose 22 to the lateral passage 14 and the chamber 15 to the vertical passage 7 and the interior of the stem 1 to be discharged through the vents 5 through the lower end of the stem. In order to produce the cutaway portion 31 the cylindrical valve member 30 is merely reduced in diameter for a limited section as illustrated on the drawings, the end portions being connected by the portions 32. Since the passages 7 and 14 are connected with the chamber 15 in substantially the center of the handle section 10, the cylindrical portion 33 of the valve member is longer than the cylindrical portion 34, the cylindrical portions 33 and 34 being separated by the cutaway portion 31. As shown in Fig. 2 the cylindrical portion 33 is extending out of the section 10 of the handle when the cutaway portion is aligned with the passageways 7 and 14, whereas the opposite end 34 of the valve is flush with the end and the abutment screw 35 prevents the valve member from moving any further.

When the valve 30 is moved to the left in Fig. 2 the end of the valve section 33 meters the flow of liquid from the passageway 14 to the passageway 7 until it completely cuts off the same by closing over the passageways as indicated in Fig. 3 wherein the abutment screw member 36 engages the section 10 and prevents the valve cylinder 30 from passing any further into the handle. The opposite end 34 is now projecting out of the handle section as shown in Fig. 3.

An annular groove 37 is formed in the section 34. An annular groove 38 is formed in the valve section 33. Each of these annular grooves is provided with a ring type seal washer of circular cross section as indicated at 40 and which is preferably made of suitable elastomer material such as plastic or rubber. These rings 40 are sufficiently large in diameter to engage the annular surface of the chamber 15 and seal therewith. These rings offer slight resistance to movement and the valve member is effective for shutting off water pressures normally found in domestic and industrial hose connections. It will be noted that the annular groove 38 is spaced a greater distance from the cutaway portion 31 so as to provide for sealing the chamber 15 when the valve is in a position as shown in Fig. 3. In its operation, the rings 40 do not pass or otherwise engage the openings of the passageways 7 and 14, thus they provide an extensive life owing to the fact that they will merely slide back and forth in a smooth cylindrical chamber 15.

It is to be understood that the invention disclosed herein is not limited in its application to the details of construction and arrangement of the parts illustrated in the accompanying drawings since the invention is capable of other embodiments and of being practiced and carried out in various ways.

I claim:

A root feeder comprising a handle having a stem with a vertical passage and depending from the handle for penetrating the soil to supply feeding solutions thereto, said handle including a central valve section and outwardly projecting grip sections extending in opposite directions forming a balanced handle, one of said grip sections having a horizontal passage connected to a liquid supply, said valve section having a transverse passage extending from one side of said valve section to the other and intersecting said horizontal passage connected through said grip to said liquid supply and also intersecting said vertical passage connected through said stem, and a valve member in said transverse passage operable to interrupt the flow of liquid from said lateral passage to said vertical passage and accessible for operation from opposite sides of said handle while gripping and rotating said stem to force it to different depths in the soil for feeding the same.

References Cited in the file of this patent

UNITED STATES PATENTS

| | | |
|---|---|---|
| 1,601,778 | Stauffer | Oct. 5, 1926 |
| 1,715,665 | Mason | June 4, 1929 |
| 1,940,990 | Ball | Dec. 26, 1933 |
| 2,505,174 | Daniels | Apr. 25, 1950 |
| 2,641,162 | Balleisen | June 9, 1953 |
| 2,656,144 | Frantz | Oct. 20, 1953 |

FOREIGN PATENTS

| | | |
|---|---|---|
| 486,054 | Germany | Nov. 11, 1929 |
| 323,619 | Great Britain | Jan. 9, 1930 |